US008702295B2

(12) United States Patent
Lin et al.

(10) Patent No.: US 8,702,295 B2
(45) Date of Patent: Apr. 22, 2014

(54) FLAT LIGHT SOURCE MODULE

(75) Inventors: Huei-Tzu Lin, Hsin-Chu (TW);
Chun-Chien Liao, Hsin-Chu (TW);
Tung-Min Su, Hsin-Chu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 0 days.

(21) Appl. No.: 13/253,087

(22) Filed: Oct. 5, 2011

(65) Prior Publication Data
US 2012/0106198 A1    May 3, 2012

(30) Foreign Application Priority Data

Oct. 27, 2010   (TW) .............................. 99136786 A

(51) Int. Cl.
*F21V 7/04* (2006.01)

(52) U.S. Cl.
USPC .............................. 362/616; 362/612; 362/613

(58) Field of Classification Search
USPC .......... 362/249.02, 311.02, 311.06, 545, 559, 362/600, 608, 610, 612, 613, 615, 616, 621, 362/625, 628, 631–634, 800, 812
See application file for complete search history.

(56) References Cited

U.S. PATENT DOCUMENTS

| | | | |
|---|---|---|---|
| 5,070,431 A * | 12/1991 | Kitazawa et al. ............. | 362/601 |
| 5,136,483 A * | 8/1992 | Schoniger et al. ............ | 362/545 |
| 6,053,621 A | 4/2000 | Yoneda | |
| 6,473,554 B1 * | 10/2002 | Pelka et al. ................... | 385/146 |
| 6,966,684 B2 * | 11/2005 | Sommers et al. ............. | 362/604 |
| 6,988,815 B1 * | 1/2006 | Rizkin et al. .................. | 362/245 |
| 7,081,645 B2 * | 7/2006 | Chen et al. ...................... | 257/99 |
| 7,134,768 B2 | 11/2006 | Suzuki | |
| 7,193,248 B2 * | 3/2007 | Weindorf et al. ............. | 257/100 |
| 7,261,452 B2 * | 8/2007 | Coushaine et al. ........... | 362/545 |
| 7,443,678 B2 * | 10/2008 | Han et al. ...................... | 361/704 |
| 7,473,022 B2 * | 1/2009 | Yoo .............................. | 362/621 |
| 7,883,252 B2 * | 2/2011 | Matsui et al. ................. | 362/612 |
| 7,883,255 B2 * | 2/2011 | Winkler ........................ | 362/615 |

(Continued)

FOREIGN PATENT DOCUMENTS

| | | |
|---|---|---|
| EP | 1780584 | 5/2007 |
| EP | 2378327 | 10/2011 |

(Continued)

OTHER PUBLICATIONS

"Search Report of Europe Counterpart Application", issued on Mar. 14, 2012, p. 1-p. 5.

(Continued)

*Primary Examiner* — Hargobind S Sawhney
(74) *Attorney, Agent, or Firm* — Jianq Chyun IP Office

(57) ABSTRACT

A flat light source module including a light guide plate, a flexible circuit board and a light emitting device is provided. The light guide plate has a light incident surface, a light exit surface and a bottom surface opposite to the light exit surface, wherein the light incident surface further includes a light incident curved surface, and the light incident curved surface is connected with the light exit surface and the bottom surface. The flexible circuit board is disposed beside the light incident curved surface along the light incident curved surface of the light guide plate. The light emitting device is disposed on the flexible circuit board, and the light emitting device has a light emitting surface facing the light incident curved surface.

16 Claims, 7 Drawing Sheets

(56) References Cited

U.S. PATENT DOCUMENTS

| | | | |
|---|---|---|---|
| 7,891,840 B1 * | 2/2011 | Kang et al. | 362/249.02 |
| 7,988,332 B2 * | 8/2011 | Lo et al. | 362/249.05 |
| 8,028,537 B2 * | 10/2011 | Hanley et al. | 62/298 |
| 8,047,698 B2 * | 11/2011 | Zhang et al. | 362/615 |
| 8,550,684 B2 * | 10/2013 | Meir et al. | 362/610 |
| 2004/0105264 A1 | 6/2004 | Spero | |
| 2004/0130912 A1 | 7/2004 | Miyashita | |
| 2006/0061286 A1 | 3/2006 | Coushaine et al. | |
| 2007/0076381 A1 | 4/2007 | Han et al. | |
| 2008/0285274 A1 * | 11/2008 | Jung | 362/240 |
| 2009/0010022 A1 | 1/2009 | Tsai | |
| 2009/0196071 A1 | 8/2009 | Matheson et al. | |
| 2009/0237958 A1 * | 9/2009 | Kim | 362/617 |
| 2009/0296368 A1 * | 12/2009 | Ramer | 362/84 |
| 2010/0128496 A1 * | 5/2010 | Chang | 362/628 |
| 2010/0149802 A1 | 6/2010 | Chang | |
| 2011/0310616 A1 * | 12/2011 | Carruthers | 362/296.05 |

FOREIGN PATENT DOCUMENTS

| | | |
|---|---|---|
| FR | 2936346 | 3/2010 |
| JP | 10-21717 | 1/1998 |
| JP | 2009-087714 | 4/2009 |

OTHER PUBLICATIONS

"Office Action of Japan Counterpart Application", issued on Dec. 17, 2013, p. 1-p. 2.

* cited by examiner

US 8,702,295 B2

FLAT LIGHT SOURCE MODULE

CROSS-REFERENCE TO RELATED APPLICATION

This application claims the priority benefit of Taiwan application serial no. 99136786, filed on Oct. 27, 2010. The entirety of the above-mentioned patent application is hereby incorporated by reference herein and made a part of this specification.

BACKGROUND OF THE INVENTION

1. Field of the Invention

The invention relates to a light source module, and more particularly to a flat light source module.

2. Description of Related Art

Conventional edge-light type light emitting diode plane lamp structures usually include a light emitting diode, a light guide plate, a reflector, an optical film, or a diffusion plate. If a non-square edge-light type light emitting diode plane lamp is desired to be developed, such as a circular shaped type (the effective light emitting region is circular), since circuit boards of light bars are straight and are not flexible, and the light emitting surface of the light emitting diode needs to be parallel with the light incident surface of the light guide plate to maintain a high effective coupling rate, thus, the typical method is to design the light guide plate to be a polygon and the non-flexible circuit boards are disposed along the sides of the polygon. Then a reflector surrounds and pastes on the light exit surface of the light guide plate causing the effective light emitting region to be circular shaped, and then a front cap with a circular opening is equipped to obtain a circular light shape. This obtains a smaller effective light emitting region of the light guide plate, and a wider lamp frame.

Generally, if the light guide plate has more sides, the area of the effective light emitting region could be closer to the overall area of the light exit surface of the light guide plate (which means the area of the ineffective light emitting region may decrease) and the overall light emitting effectiveness may rise. Thus, the lamp exterior frame (ineffective region) also becomes narrower. However, the drawback is it is difficult to fabricate and the production cost is high. Even though the production cost is lowered if a quantity of light bars is decreased, sides in the effective light emitting region close to where there are no light bars are prone to form dark regions where the brightness is insufficient.

FIG. 2 of U.S. Pat. No. 7,134,768 discloses a light source apparatus of a light emitting diode. The light source apparatus includes a light guide plate and a plurality of light emitting diode light sources, wherein the light guide plate has rotational symmetry about a central axis, and the light emitting diode light sources are arranged in a circle about the central axis. In addition, FIG. 9 of U.S. patent publication No. 20090196071 discloses an illumination system. The illumination system includes a circular-shaped light guide plate and a light emitting diode light source disposed in the center of the circular-shaped light guide plate, wherein the circular-shaped light guide plate further includes a plurality of dots disposed on the surface, and a reflective layer may be disposed on the opposite surface of a light exit surface. Furthermore, FIG. 3B of U.S. patent publication No. 20040105264 discloses a light emitting diode illumination apparatus. The illumination apparatus includes a plurality of light emitting diodes, and the light emitting diodes are placed in a flexible circuit board of a soft-type board to form a light bar, wherein the light bar is placed on a curved surface.

SUMMARY OF THE INVENTION

The invention provides a flat light source module. The flat light source module may provide a planar light source with better light uniformity, and has a smaller size and lower production cost.

Other objects and advantages of the invention can be further illustrated by the technical features broadly embodied and described as follows.

In order to achieve one or a portion of or all of the objects or other objects, an embodiment of the invention provides a flat light source module, including a light guide plate, a flexible circuit board, and a light emitting device. The light guide plate includes a light incident surface, a light exit surface, and a bottom surface. The light exit surface is opposite to the bottom surface, wherein the light incident surface further includes a light incident curved surface, and the light incident curved surface is connected with the light exit surface and the bottom surface. The flexible circuit board is disposed along the light incident curved surface of the light guide plate. The light emitting device is disposed on the flexible circuit board, and the light emitting device includes a light emitting surface facing the light incident curved surface.

In an embodiment of the invention, the flexible circuit board includes a device bonding surface, the device bonding surface faces the light incident curved surface of the light guide plate, and the light emitting device is disposed on the device bonding surface of the flexible circuit board.

In an embodiment of the invention, at least one flexible circuit board includes a metal copper-clad laminate (MCCL).

In an embodiment of the invention, the light emitting surface of the light emitting device is parallel to the tangent line of the corresponding light incident curved surface of the light guide plate.

In an embodiment of the invention, the light incident curved surface includes a circular light incident curved surface or an elliptical light incident curved surface.

In an embodiment of the invention, the light incident curved surface further includes a first curved surface and a second curved surface, and the first curved surface is opposite to the second curved surface. In an embodiment of the invention, curvatures of the first curved surface and the second curved surface are either identical or different. In an embodiment of the invention, the light incident surface further includes a first plane and a second plane opposite to the first plane, the first plane connects the first curved surface and the second curved surface, and the second plane connects the first curved surface and the second curved surface.

In an embodiment of the invention, the flat light source module further includes a plurality of light scattering microstructures, disposed on the bottom surface or the light exit surface of the light guide plate. In an embodiment of the invention, a density of the light scattering microstructures disposed on the bottom surface or the light exit surface of the light guide plate gradually becomes denser in a direction moving away from the light emitting surface. In an embodiment of the invention, the light scattering microstructures are uniformly arranged on the bottom surface or the light exit surface of the light guide plate.

In an embodiment of the invention, a thickness of the light guide plate gradually becomes thinner going away from the light incident surface to a center of the light guide plate. In an embodiment of the invention, the light guide plate is a similar wedge-shaped light guide plate.

In an embodiment of the invention, the flat light source module further includes a reflector, disposed on the bottom surface of the light guide plate.

In an embodiment of the invention, the flat light source module further includes an optical film assembly, disposed on the light exit surface, wherein the optical film assembly includes at least one of a diffusion film, a prism film, and a brightness-enhanced film.

In an embodiment of the invention, the light emitting device is a light emitting diode device.

Based on the above, the embodiment of the invention may have at least one of the advantages. The embodiment of the invention disposes the flexible circuit board beside the light incident curved surface of the light guide plate and curves the flexible circuit board along the light incident curved surface, and the light emitting surface of the light emitting device faces the light incident curved surface. Thus, the flat light source module does not require a conventional front cap to cover the light guide plate or pasting a reflector on the light exit surface of the light guide plate to cover the regions other than the effective light emitting region and may directly show the light shape desired by the user, such as: circular shaped, elliptical shaped, or other closed figures with different arc-shaped curvatures. Through the above concept, the flat light source module of the embodiment may effectively lower production cost (i.e. reduce the use of the front cap and the reflector to achieve the desired light shape), raise light beam utilization, and further reduce the overall size.

In addition, since the flexible circuit board curves along the light incident curved surface of the light guide plate, the light emitting device may shine on all the light incident curved surface. Thus, the light field distribution of the light exit surface of the light guide plate could not have the problem of dark corners. In other words, the flat light source module of the embodiment provides a planar light source with better uniformity.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
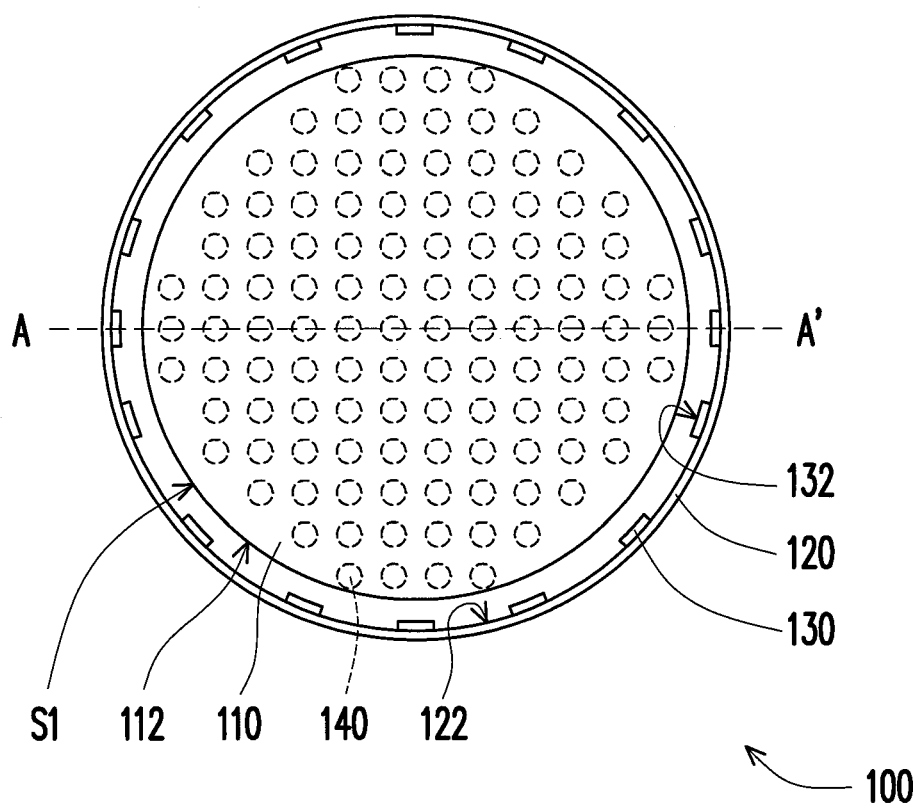
FIG. 1A is a schematic top view of a flat light source module according to an embodiment of the invention.
Figure 1B:
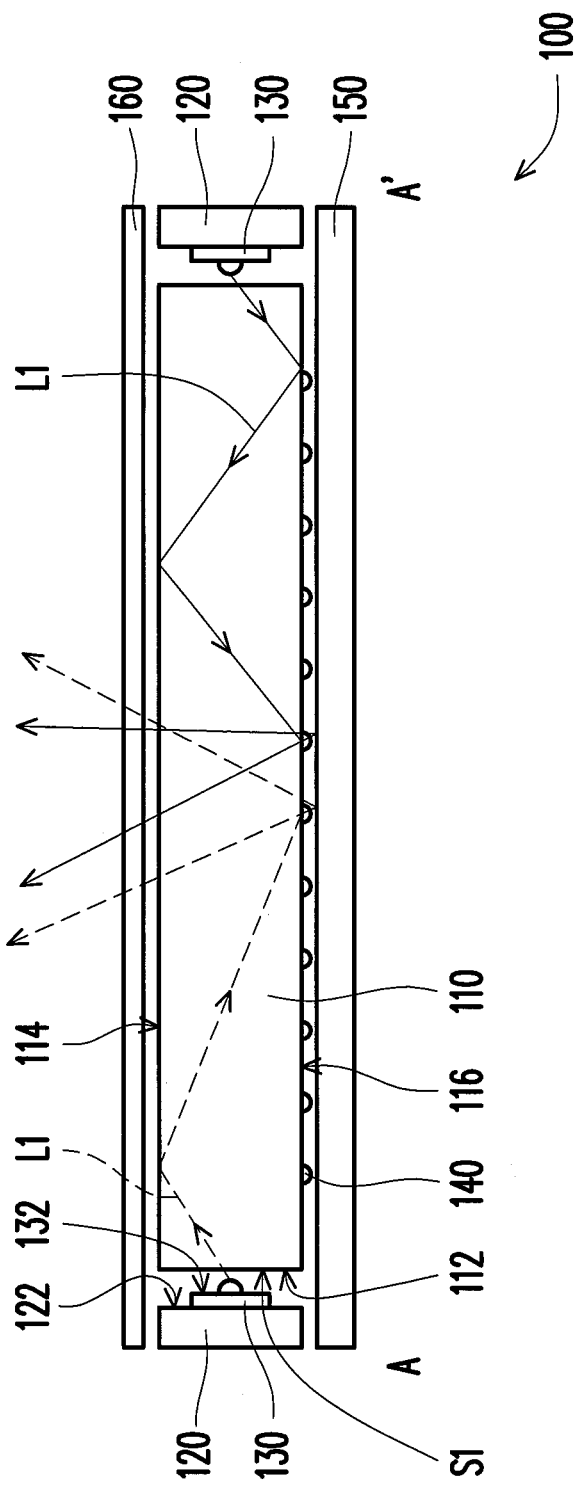
FIG. 1B is a cross-sectional view of the flat light source module in FIG. 1A taken along a line AA'.

FIG. 1A is a schematic top view of a flat light source module according to an embodiment of the invention. FIG. 1B is a cross-sectional view of the flat light source module in FIG. 1A taken along a line AA'. Referring to FIG. 1A and FIG. 1B simultaneously, in the embodiment, the flat light source module 100 includes a light guide plate 110, a flexible circuit board 120, and a light emitting device 130. The light guide plate 110 includes a light incident surface S1, a light exit surface 114, and a bottom surface 116. The light exit surface 114 is opposite to the bottom surface 116, wherein the light incident surface S1 further includes a light incident curved surface 112, and the light incident curved surface 112 is connected with the light exit surface 114 and the bottom surface 116. In the embodiment, the light guide plate 110 is, for example, a flat-type light guide plate as shown in FIG. 1B, but is not limited thereto. The light guide plate 110 may also be other types of light guide structures. Details are further described later.

The light guide plate 110 as shown in FIG. 1A is, for example, a circular light guide plate. Thus, in the embodiment, the light incident curved surface 112 is structurally a circular light incident curved surface, wherein the circular light incident curved surface is defined by the schematic top view in FIG. 1A. Also, the shape of the light incident curved surface 112 of FIG. 1A is a form of a side surface of a cylinder body.

Please refer to FIG. 1A and FIG. 1B. The flexible circuit board 120 curves along the light incident curved surface 112 of the light guide plate 110, and the light emitting device 130 is disposed on the flexible circuit board 120, wherein the light emitting device 130 includes a light emitting surface 132 facing the light incident curved surface 112. The light emitting surface 132 is parallel to the tangent line of the corresponding light incident curved surface 112 of the light guide plate 110. In the embodiment, the light emitting device 130 is suitable to provide a light beam L1. The light beam L1 is suitable to pass through the light incident curved surface 112 and enter the light guide plate 110, as shown in FIG. 1B. In addition, the light emitting device 130 of the embodiment is, for example, a light emitting diode device.

Refer to FIG. 1A, the flexible circuit board 120 curves along the light incident curved surface 112 of the light guide plate 110 to form the circular shape shown in FIG. 1A. This causes the effective light emitting region of the light guide plate 110 to be bigger, the outer frame of the lamp to be narrower, and the area of the effective light emitting region may essentially equal the area of the light exit surface 114 of the light guide plate 110. In detail, if the flat light source module is desired to provide a light shape that is circular, elliptical, or other arc-shaped closed figures with different curvatures, the light exit surface of the flat light source module is covered with a front cap similar to the light shape desired by the user or a reflector is pasted on the light exit surface of the light guide plate to cover the regions other than the effective light emitting region to obtain the desired light shape conventionally. However, this increases the production cost (i.e. the use of the front cap and reflector), reduces the light beam utilization (i.e. light beams covered by the front cap and the reflector), and fails to reduce the overall size (i.e. the light exit surface not exposed by the front cap opening).

The embodiment uses the flexible circuit board 120 of FIG. 1A to surround the light incident curved surface 112 of the light guide plate 110, and the light emitting surface 132 of the light emitting device 130 faces the light incident curved surface 112. In other words, the embodiment adopts a design where the flexible circuit board 120 surrounds the light incident curved surface 112 of the light guide plate 110, and may effectively reduce the production cost of the flat light source module 100, raise the light beam utilization, and further reduce the overall size.

It should be noted that the design where the flexible circuit board 120 curves along the light incident curved surface 112 of the light guide plate 110 not only has the aforementioned advantages, but since the flexible circuit board 120 curves along the light incident curved surface 112 of the light guide plate 110, the light field distribution of the light exit surface 114 of the light guide plate 110 could not have the problem of dark corners. In other words, the flat light source module 100 of the embodiment provides a planar light source with better uniformity.

In the embodiment, the flexible circuit board 120 includes a device bonding surface 122, wherein the device bonding surface 122 faces the light incident curved surface 112 of the light guide plate 110, and the light emitting device 130 is disposed on the device bonding surface 122 of the flexible circuit board 120, as shown in FIG. 1A and FIG. 1B. In addition, the flexible circuit board 120 of the embodiment, for example, adopts metal copper-clad laminates (MCCL). The comparison between the circuit board of the metal copper-clad laminate, conventional metal core printed circuit boards (MCPCB) and flexible circuit boards (FCB) are shown in Table 1.

TABLE 1

|  | Flexible circuit board of the embodiment Metal copper-clad laminates | Conventional rigid circuit board Metal core printed circuit boards | Conventional soft-type circuit board Flexible circuit boards |
| --- | --- | --- | --- |
| FLAMMABILITY | UL94 V0 | UL94 V0 | UL94 V0 |
| THERMAL CONDUCTIVITY (W/mK) | 2.0~2.2 | 2.0 | 0.12 |
| BREAK DOWN VOLTAGE (AC KV/min) | >3 | 1.5-3.8 | 0.15 |

As seen from Table 1, the flexible circuit board 120 of the embodiment adopts a circuit board of metal copper-clad laminates different from general flexible circuit boards. The circuit board of metal copper-clad laminates has higher thermal conductivity and break down voltage ability. Thus, the circuit board of metal copper-clad laminates will not have the problem of bad heat dissipation affecting optical effectiveness found in flexible circuit boards. Also, the circuit board of metal copper-clad laminates may bear a light emitting device with more power, so a smaller quantity of light emitting devices may still maintain the overall optical brightness of the flat light source module 100.

In the embodiment, the flat light source module 100 further includes a plurality of light scattering microstructures 140 disposed on the bottom surface 116 or the light exit surface 114 of the light guide plate 110. The flat light source module 100 also further includes a reflector 150 disposed on the bottom surface 116 of the light guide plate 110, as shown in FIG. 1A and FIG. 1B. Specifically, when the light beam L1 enters the light guide plate 110, the light beam L1 encounters the light scattering microstructures 140 to cause a portion of the light beam L1 to enter the light exit surface 114 at an incident angle smaller than the critical angle, thus passing through the light exit surface 114 to the outside of the flat light source module 100. In addition, in the embodiment, another portion of the light beam L1 encounters the light scattering microstructures 140, then scatters and transmits to the reflector 150 disposed on the bottom surface 116. The reflector 150 is suitable to reflect the light beam L1, and suitable to cause the light beam L1 to sequentially pass through the bottom surface 116 and the light exit surface 114, and suitable to transmit to the outside of the flat light source module 100. This raises the light beam utilization, and causes the flat light source module 100 to provide planar light source with better light intensity.

In the embodiment, the light scattering microstructures 140 are uniformly arranged on the bottom surface 116 or the light exit surface 114 of the light guide plate 110, as shown in FIG. 1A and FIG. 1B. The embodiment for example, disposes the light scattering microstructures on the bottom surface 116 of the light guide plate 110, but the invention is not limited thereto. In another undrawn embodiment, the flexible circuit board 120 may also be partially disposed along the light incident curved surface 112 (i.e. semi-circular), and the density of these light scattering microstructures 140 disposed on the light guide plate 110 become gradually denser in a direction moving away from the light emitting surface 132.

In order to further control the light shape and uniformity of the light beam L1 exited from the light exit surface 114, the flat light source module 100 of the embodiment adopts an optical film assembly 160 disposed on the light exit surface 114. In the embodiment, the optical film assembly 160 includes at least one of a diffusion film, a prism film, and a brightness-enhanced film. After the light beam L1 passes through the diffusion film, a uniformity effect is achieved. When the light beam L1 passes through the prism film and the brightness-enhanced film, a converging effect of the light exit angle is achieved. In addition, in other embodiments, the optical films in the optical film assembly 160 may also be other optical films with suitable microstructure.

Figure 2:
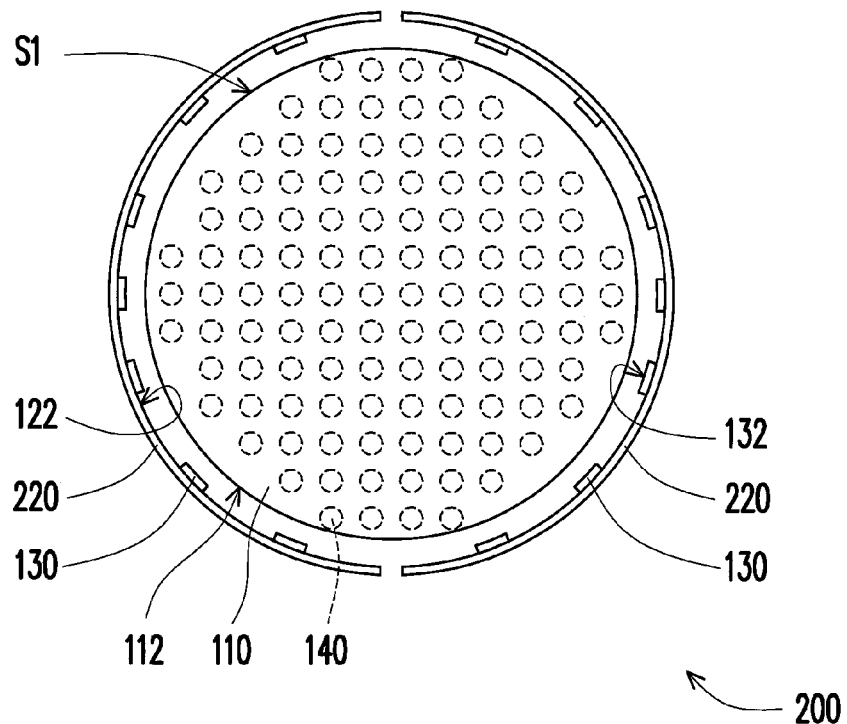
FIG. 2 is a schematic top view of a flat light source module according to another embodiment of the invention.

FIG. 2 is a schematic top view of a flat light source module according to another embodiment of the invention. Referring to FIG. 1A and FIG. 2, a flat light source module 200 of the embodiment is similar to the above-described flat light source module 100. The difference between the two is described below. In the flat light source module 200 of the embodiment, the quantity of a flexible circuit board 220 is two, and these flexible circuit boards 220 curve along the light incident curved surface 112 of the light guide plate 110 or curve along a part of the light incident curved surface 112 of the light guide plate 110 (i.e. oppositely disposed or adjacently disposed), and surround the light incident curved surface 112 of the light guide plate 110. In another undrawn embodiment, the quantity of a flexible circuit board 220 is greater than two, and these flexible circuit boards 220 also curve along the light incident curved surface 112 of the light guide plate 110, and surround the light incident curved surface 112 of the light guide plate 110 or curve along a part of the light incident curved surface 112 of the light guide plate 110.

Figure 3:
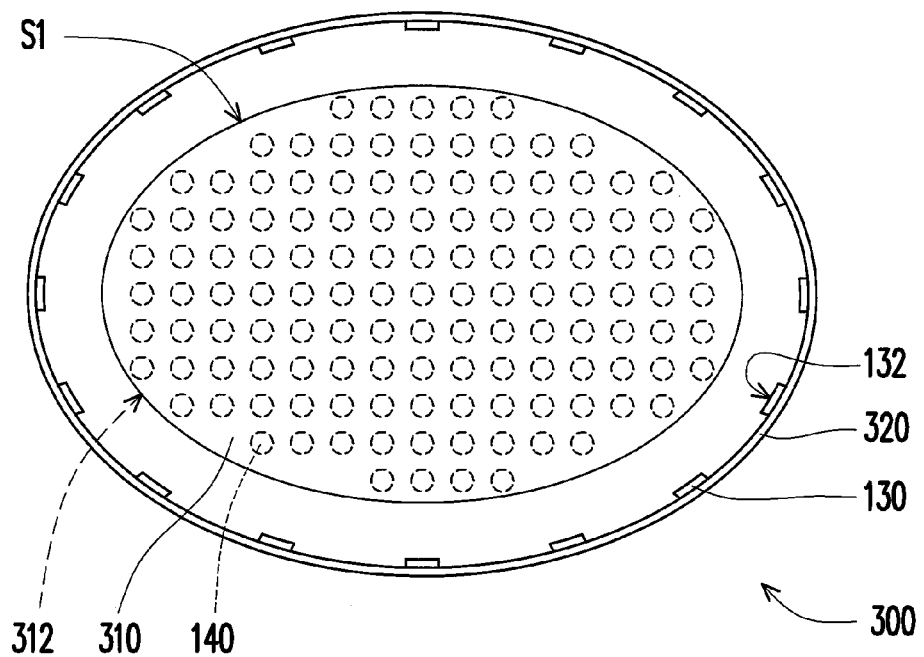
FIG. 3 is a schematic top view of a flat light source module according to yet another embodiment of the invention.

FIG. 3 is a schematic top view of a flat light source module according to yet another embodiment of the invention. Referring to FIG. 1A and FIG. 3, a flat light source module 300 of the embodiment is similar to the above-described flat light source module 100. The difference between the two is described below. In the flat light source module 300 of the embodiment, a light guide plate 310, for example, adopts an elliptical light incident curved surface structure, wherein the elliptical light incident curved surface is defined by the schematic top view in FIG. 3. Similarly, in order for the light beam of the light emitting device 130 to effectively enter the light guide plate 310, the curvature of a flexible circuit board 320 also curves along the curvature of a light incident curved surface 312, as shown in FIG. 3.

Figure 4:
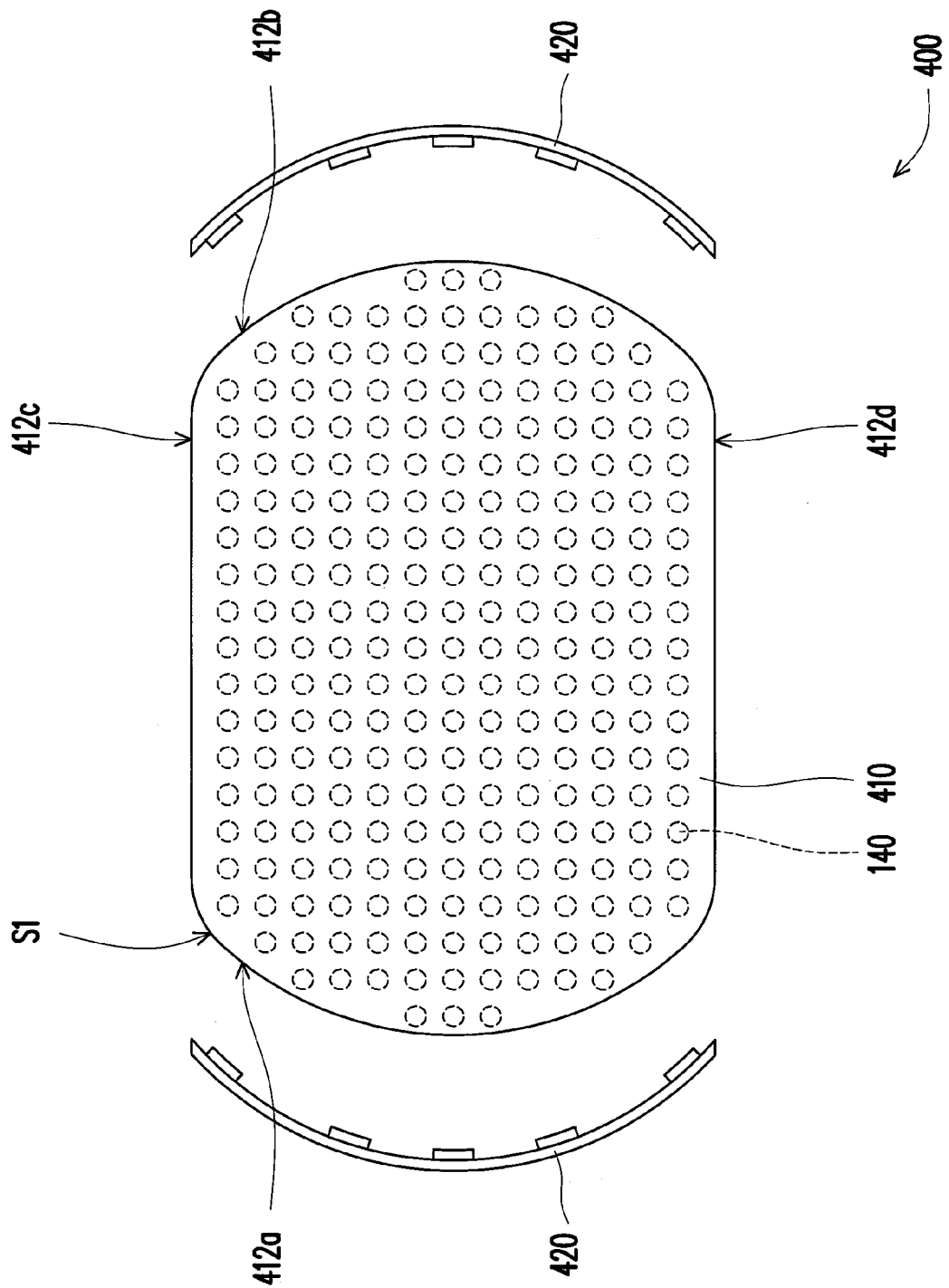
FIG. 4 is a schematic top view of a flat light source module according to still another embodiment of the invention.

FIG. 4 is a schematic top view of a flat light source module according to still another embodiment of the invention. Referring to FIG. 1A and FIG. 4, a flat light source module 400 of the embodiment is similar to the above-described flat light source module 100. The difference between the two is described below. In the flat light source module 400 of the embodiment, a light incident curved surface 412 of the light incident surface S1 of a light guide plate 410 includes a first curved surface 412a and a second curved surface 412b. The light incident surface S1 further includes a first plane 412c and a second plane 412d. The first curved surface 412a is opposite to the second curved surface 412b, and the first plane 412c is opposite to the second plane 412d. The first plane 412c connects the first curved surface 412a and the second curved surface 412b, and the second plane 412d connects the first curved surface 412a and the second curved surface 412b. In addition, the curvatures of the first curved surface 412a and the second curved surface 412b are either identical or different. The embodiment has identical curvatures, for example, but is not limited thereto.

In the flat light source module 400, the quantities of the flexible circuit board 420 are two, and these flexible circuit boards 420 curve along the light incident curved surface 412 of the light guide plate 410, and are disposed around the light incident curved surface 412 of the light guide plate 410. In another embodiment, the quantities of the flexible circuit board 420 are four, wherein some of the flexible circuit boards 420 do not curve and are disposed along the first plane 412c and the second plane 412d, as shown in a flat light source module 500 in FIG. 5. It should be noted that the embodiment may also use a metal core printed circuit board or a flexible circuit board to be disposed along the first plane 412c and the second plane 412d, and then use a circuit board of metal copper-clad laminates to curve along the light incident curved surface 412.

Figure 5:
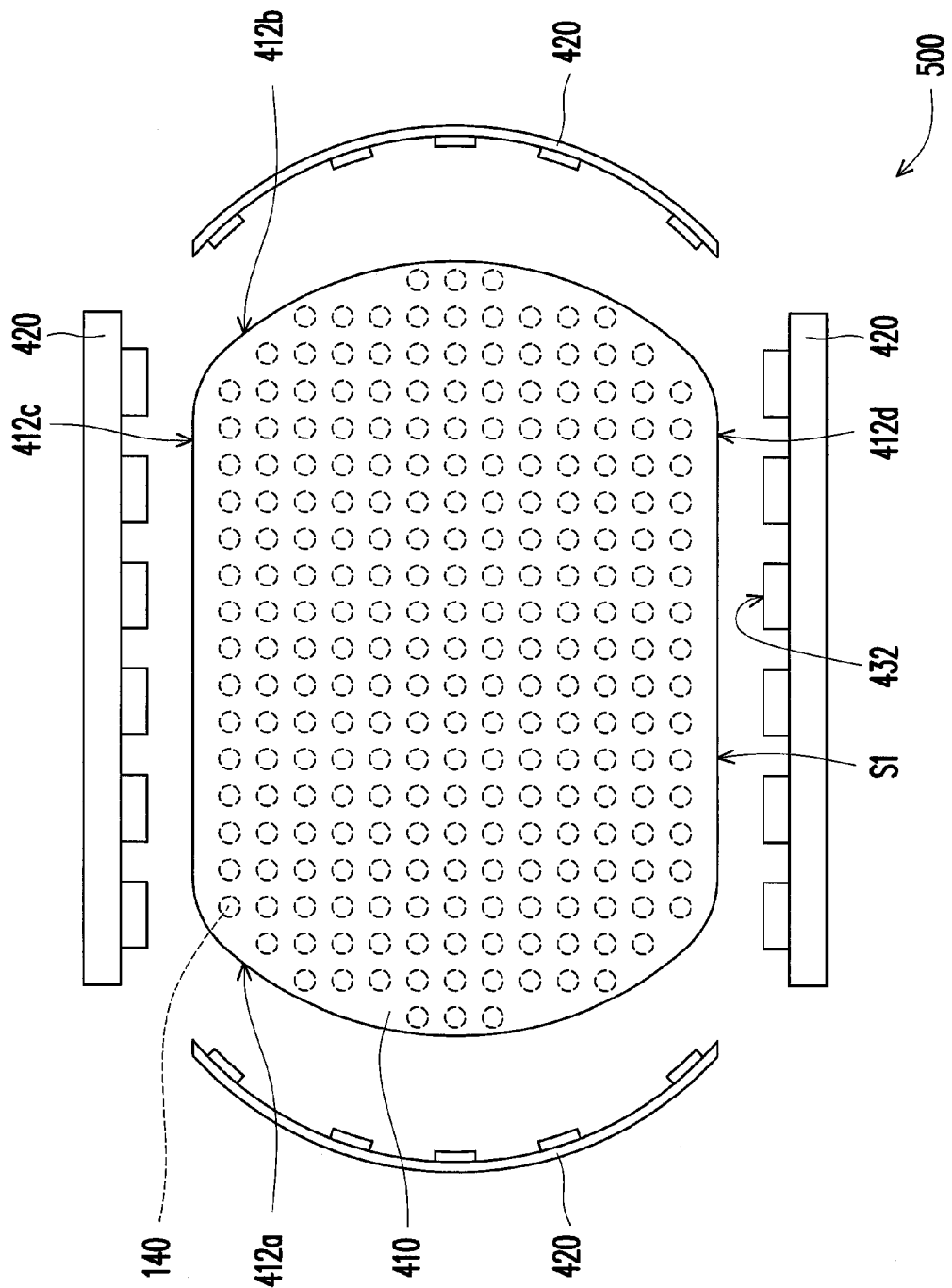
FIG. 5 is a schematic top view of a flat light source module according to another altered embodiment of FIG. 4.

In the flat light source module 500 as shown in FIG. 5, since flexible circuit boards 420 are disposed on the sides of both the first plane 412c and the second plane 412d, thus, the light uniformity and light intensity of the planar light source provided by the flat light source module 500 may further be improved.

Figure 6:
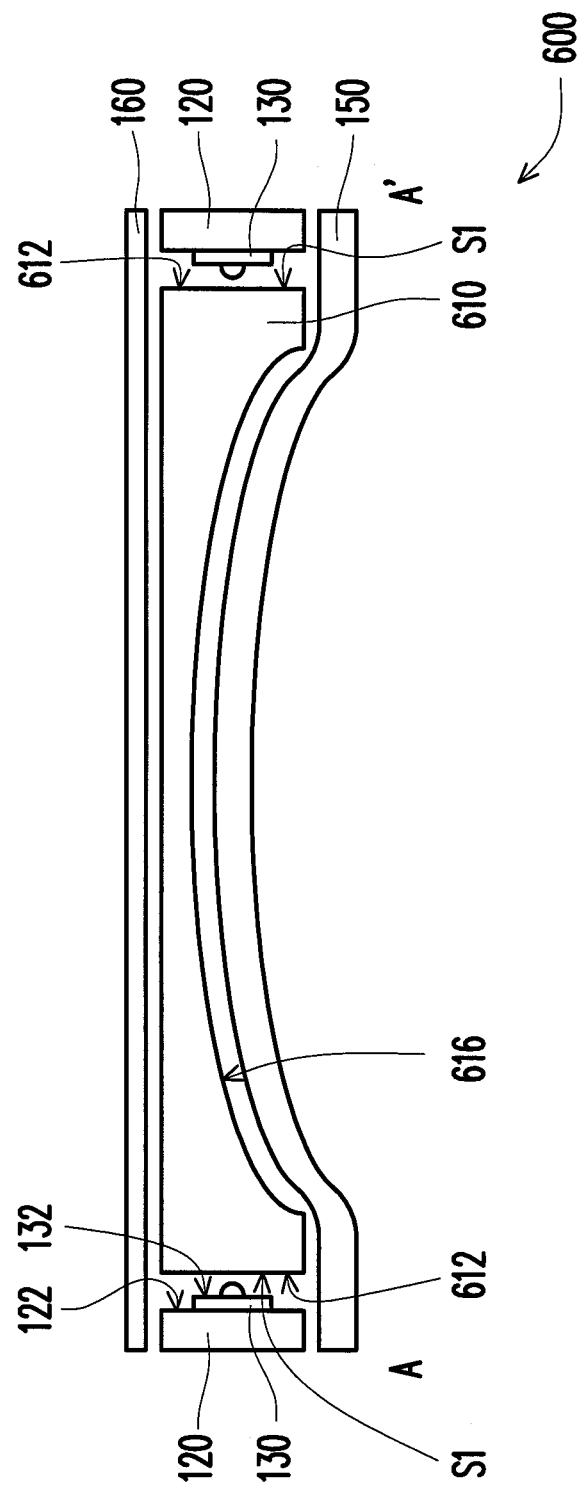
FIG. 6 is a cross-sectional view of the flat light source module of another embodiment in FIG. 1A taken along a line AA'.

FIG. 6 is a cross-sectional view taken along a line AA' in FIG. 1A about another embodiment of the flat light source module. Referring to FIG. 6 and FIG. 1B, the structure and concept of the flat light source module 600 of the embodiment is similar to the above-described flat light source module 100. The difference between the two is described below. In the flat light source module 600 of the embodiment, a thickness of the light guide plate 610 gradually becomes thinner going away from the light incident surface 612 to a center of the light guide plate 610, as shown in FIG. 6. In other words, a bottom surface 616 of the light guide plate 610 of the embodiment appears an arc-shaped curve surface as shown in FIG. 6. In the embodiment, the light guide plate 610 is a similar wedge-shaped light guide plate. It should be noted that since the light guide plate 610 uses the concept and principle of a similar wedge-shaped light guide plate structure, the flat light source module 600 of the embodiment does not have to adopt the design with the aforementioned light scattering microstructures 140. In addition, the similar wedge-shaped structure of the light guide plate 610 of the embodiment may also be used by the aforementioned flat light source modules 200, 300, 400, and 500.

Figure 7:
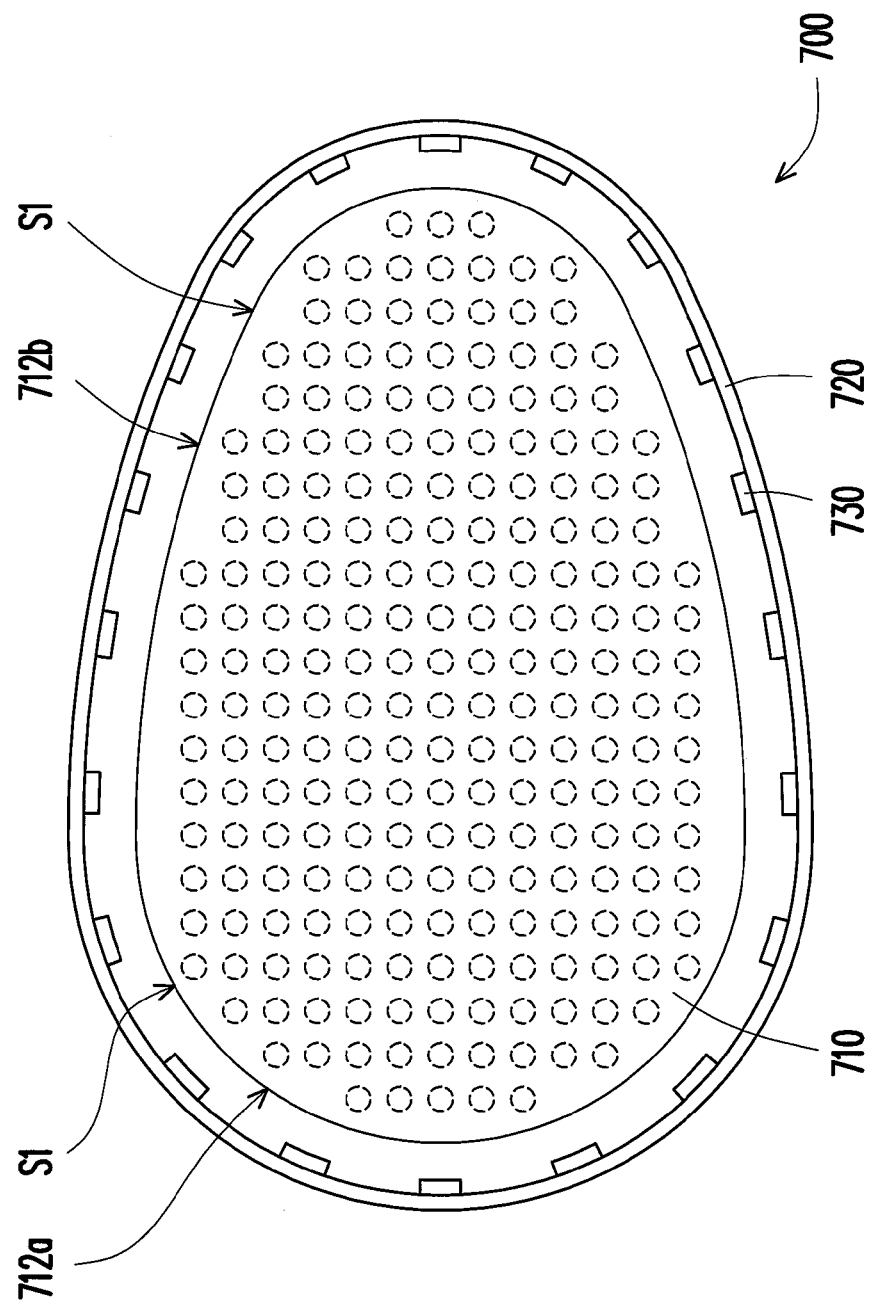
FIG. 7 is a schematic top view of a flat light source module according to still another embodiment of the invention.

FIG. 7 is a schematic top view of a flat light source module according to still another embodiment of the invention. Referring to FIG. 1A and FIG. 7, a flat light source module 700 of the embodiment is similar to the above-described flat light source module 100. The difference between the two is described below. In the flat light source module 700 of the embodiment, a light incident curved surface 712 of the light incident surface S1 of a light guide plate 710 further includes a first curved surface 712a and a second curved surface 712b, wherein the first curved surface 712a and the second curved surface 712b are opposite and connected to each other. In the embodiment, the curvatures, for example, of the first curved surface 712a and the second curved surface 712b are different. Similarly, in order for the light beam of the light emitting device 730 to effectively enter the light guide plate 710, the curvature of a flexible circuit board 720 also curves along the curvature of a light incident curved surface 712, as shown in FIG. 7.

It should be noted that in the flat light source modules 100, 200, 300, 400, 500, 600, and 700, the light emitting surface of the light emitting device is parallel to the tangent line of the corresponding light incident curved surface of the light guide plate. Thus, the light beam provided by the light emitting device enters the light guide plate more easily.

To sum up, the flat light source module in the embodiment of the invention at least has the following advantages: The invention disposes the flexible circuit board beside the light incident curved surface of the light guide plate and curves along the light incident curved surface, and the light emitting surface of the light emitting device faces the light incident curved surface. Thus, the flat light source module does not require a front cap that covers the conventional flat light source module or a reflector that is pasted on the light exit surface of the light guide plate to cover the regions other than the effective light emitting region to obtain the desired light shape, such as: circular shaped, elliptical shaped, or other arc-shaped closed figures with different curvatures. Through the above concept, the flat light source module of the embodiment may effectively lower the production cost (i.e. reduce the use of the front cap and the reflector), raise the light beam utilization, and further reduce the overall size.

In addition, since the flexible circuit board curves along the light incident curved surface of the light guide plate, the light emitting device may shine on all the locations of the light incident curved surface. Thus, the light field distribution of the light exit surface of the light guide plate will not have the problem of dark corners. In other words, the flat light source module of the embodiment provides a planar light source with better uniformity.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A flat light source module, comprising:
a light guide plate having a light incident surface, a light exit surface, and a bottom surface, the light exit surface being opposite to the bottom surface, wherein the light incident surface further has a light incident curved surface, a first plane and a second plane opposite to the first plane, and the light incident curved surface is connected with the light exit surface and the bottom surface, wherein the light incident curved surface of the light incident surface further comprises a first curved surface and a second curved surface, the first curved surface is opposite to the second curved surface, the first plane connects the first curved surface and the second curved surface, and the second plane connects the first curved surface and the second curved surface;
a plurality of flexible circuit boards disposed along the light incident curved surface of the light guide plate, wherein the flexible circuit boards comprise a plurality of metal copper-clad laminates, the metal copper-clad laminates are disposed along the first curved surface and the second curved surface, wherein a plurality of metal core printed circuit boards are disposed along the first plane and the second plane; and
light emitting devices disposed on the flexible circuit board and the metal core printed circuit boards, and the light emitting device disposed on the flexible circuit board having a light emitting surface facing the light incident curved surface, wherein the light emitting surface of the light emitting device is parallel to a tangent line of the corresponding light incident curved surface of the light guide plate.

2. The flat light source module as claimed in claim 1, wherein the flexible circuit board comprises a device bonding surface, the device bonding surface faces the light incident curved surface of the light guide plate, and the light emitting device is disposed on the device bonding surface of the flexible circuit board.

3. The flat light source module as claimed in claim 1, wherein the light incident curved surface comprises a circular light incident curved surface or an elliptical light incident curved surface.

4. The flat light source module as claimed in claim 1, wherein curvatures of the first curved surface and the second curved surface are identical.

5. The flat light source module as claimed in claim 1, wherein a thickness of the light guide plate gradually becomes thinner in a direction going away from the light incident surface to a center of the light guide plate.

6. The flat light source module as claimed in claim 5, wherein the light guide plate is a similar wedge-shaped light guide plate.

7. The flat light source module as claimed in claim 1, further comprising a reflector disposed on the bottom surface of the light guide plate.

8. The flat light source module as claimed in claim 1, further comprising an optical film assembly disposed on the light exit surface, wherein the optical film assembly comprises at least one of a diffusion film, a prism film, and a brightness-enhanced film.

9. The flat light source module as claimed in claim 1, wherein the light emitting device is a light emitting diode device.

10. The flat light source module as claimed in claim 1, wherein curvatures of the first curved surface and the second curved surface are different.

11. The flat light source module as claimed in claim 1, further comprising a plurality of light emitting devices disposed on the flexible circuit board, wherein the light emitting surface of each of the plurality of the light emitting devices faces the corresponding light incident curved surface and the flexible circuit board substantially encompasses the corresponding light incident curved surface.

12. The flat light source module as claimed in claim 1, wherein the light incident curved surface is a convex surface with respect to the light guide plate.

13. The flat light source module as claimed in claim 1, wherein a curvature of the flexible circuit board curves along a curvature of the light incident curved surface.

14. The flat light source module as claimed in claim 1, further comprising a plurality of light scattering microstructures disposed on at least one of the bottom surface of the light guide plate and the light exit surface of the light guide plate.

15. The flat light source module as claimed in claim 14, wherein a density of the light scattering microstructures gradually becomes denser in a direction moving away from the light emitting surface.

16. The flat light source module as claimed in claim 14, wherein the light scattering microstructures are uniformly arranged.

* * * * *